Fig. 1.

Dec. 17, 1946.  C. W. RICE  2,412,631
HIGH FREQUENCY APPARATUS
Filed April 9, 1936  4 Sheets-Sheet 4

Inventor:
Chester W. Rice,
by Harry E. Dunham
His Attorney.

Patented Dec. 17, 1946

2,412,631

UNITED STATES PATENT OFFICE 2,412,631

HIGH-FREQUENCY APPARATUS

Chester W. Rice, Schenectady, N. Y., assignor to General Electric Company, a corporation of New York Application April 9, 1936, Serial No. 73,511

38 Claims. (Cl. 250—1)

My invention relates to high frequency radio apparatus and one of its objects is to provide an improved method and means for obtaining information as to the position and motion of an object with respect to a single observation point.

It is a further object of my invention to provide an improved method and means for locating an object by determining its bearing and range from a single observation point.

It is a further object of my invention to provide an improved method and means for determining the line of sight velocity and direction of motion along the line of sight of an object from a single observation point.

It is a further object of my invention to provide a novel method for obtaining an echo from a distant surface.

In accordance with my invention a high frequency radio wave is employed in ascertaining desired information with reference to the position, motion, etc. of a distant object, the high frequency wave being transmitted toward the distant object and its echo being received and utilized to produce the desired indication. One of the objects of my invention is to effect certain improvements in equipment employed for such purposes whereby positive indication of the position of an object, its motion, velocity, etc. may be obtained notwithstanding that the object is of relatively small dimensions and is located at a great distance from the observation point.

In accordance with my invention radio waves of extremely short wave lengths are employed. Important advantages may be secured by the use of such waves, first because they may conveniently be directed against the desired object, and effectively received after impingement thereon, and secondly, because their behavior after impingement upon the desired object lends itself advantageously to securing a resultant echo in the direction from which the waves arrive at the surface. That is, for example, in accordance with the laws of reflection the angle of incidence equals the angle of reflection. Accordingly, if it be assumed that the wave employed follows the laws of reflection and the transmitted wave impinges upon a plane surface oblique to the direction of propagation of the wave little or no energy returns in the direction from which it came, but instead practically all of the impinging energy travels in a direction determined by the angles of incidence and reflection. Accordingly, no satisfactory indication may be obtained at the transmitting point.

Of course, if there be irregularities in the surface upon which the wave impinges which are large relative to the wave length employed, the resulting wave travels in directions dependent upon the orientation of the irregularities.

Waves of very short wave length, such as I contemplate to employ, when impinging upon a distant irregular surface are known to scatter in all directions about the point of impingement in accordance with a cosine law. Accordingly, a substantial portion of the scattered energy returns in the direction from which it came. These waves further may be short relative to any irregularities which exist in objects of the kind to be located or observed thereby increasing the energy likely to return toward the observer. The scattering of high frequency energy after impingement upon a distant surface increases rapidly with frequency. Accordingly it is important that extremely short wave lengths be employed. I have obtained extremely satisfactory results with waves having a length of 4.8 centimeters.

These wavelengths are advantageous in the location, and observation of the movement of distant objects, such as moving craft, for example, since such craft possess surfaces small relative to a wavelength, which are disposed at diverse angles with respect to the direction of propagation of such waves, and which, therefore, effectively scatter such radiation. Such surfaces may comprise the rails, lattice work or mesh about the decks of a vessel, pipes, or chairs upon the decks, or portions of the propellers, wheels, chassis, struts, etc. of aircraft. At the same time such craft also possess numerous plane, or nearly plane, or curve surfaces of large radius of curvature, having dimensions large relative to a wavelength. Any such surface disposed at right angles to the direction of propagation of waves impinging on it reradiates said waves with a directivity pattern which is bisected by the direction of propagation of the impinging waves. This reradiation is highly directive if the surface has effective lateral dimensions of from five to ten times the wavelength in the direction from which the waves are received and thus is very effective in the production of echoes. Of course, this directivity is reduced if the surface be of smaller dimensions, the small surfaces tending as above, to scatter the radiation.

While I have mentioned wavelengths of 4.8 centimeters, it will be understood that I am not to be limited thereto since these effects may be produced by waves of different length in this order. The wave length preferably, however, should not be less than two centimeters since for shorter waves appreciable undesired scattering may be produced by the surfaces of raindrops or hailstones. At the same time I prefer to use waves of not more than eight centimeters in length since with such waves surfaces, on moving craft, for example, having dimensions sufficiently large relative to a wavelength to produce sharply directive reradiation of energy impinging thereon, are more numerous, and hence are more likely to improve the echoes received. Such surfaces may be highly important especially in the detection or observation of aircraft.

When employing waves of such wave length, apparatus may be employed which is small in dimensions and which at the same time is capable of efficiently directing the wave toward the desired object, and of receiving such waves only from a particular direction as from the desired object. Such apparatus may be mounted, for example, on moving craft without objectionable encumberment and at the same time be capable of directing a sharp beam of short radio waves over relatively great distances and obtain a satisfactory indication therefrom.

It is to be understood that the term "radio echo" as used herein refers not only to a true echo as may be obtained by propagating a high frequency impulse and causing a portion of the impulse to be reflected to the transmitting point but also to any continuous wave whether modulated or not that may be propagated, scattered by an object and a portion returned to the transmitting point.

Similarly, the term "scattered radiation," when employed herein with reference to the wave which returns from a distant object to the receiver of my equipment, applies to all of the energy returning to the receiver irrespective of the cause of its return, or whether it be due to scattering from the surface of the distant object, reflection, or otherwise.

The novel features which I believe to be characterized of my invention are set forth with particularity in the appended claims. My invention itself, however, both as to its arrangement and method of operation together with further objects and advantages thereof may best be understood by reference to the following description taken in connection with the accompanying drawings in which

Figure 1:
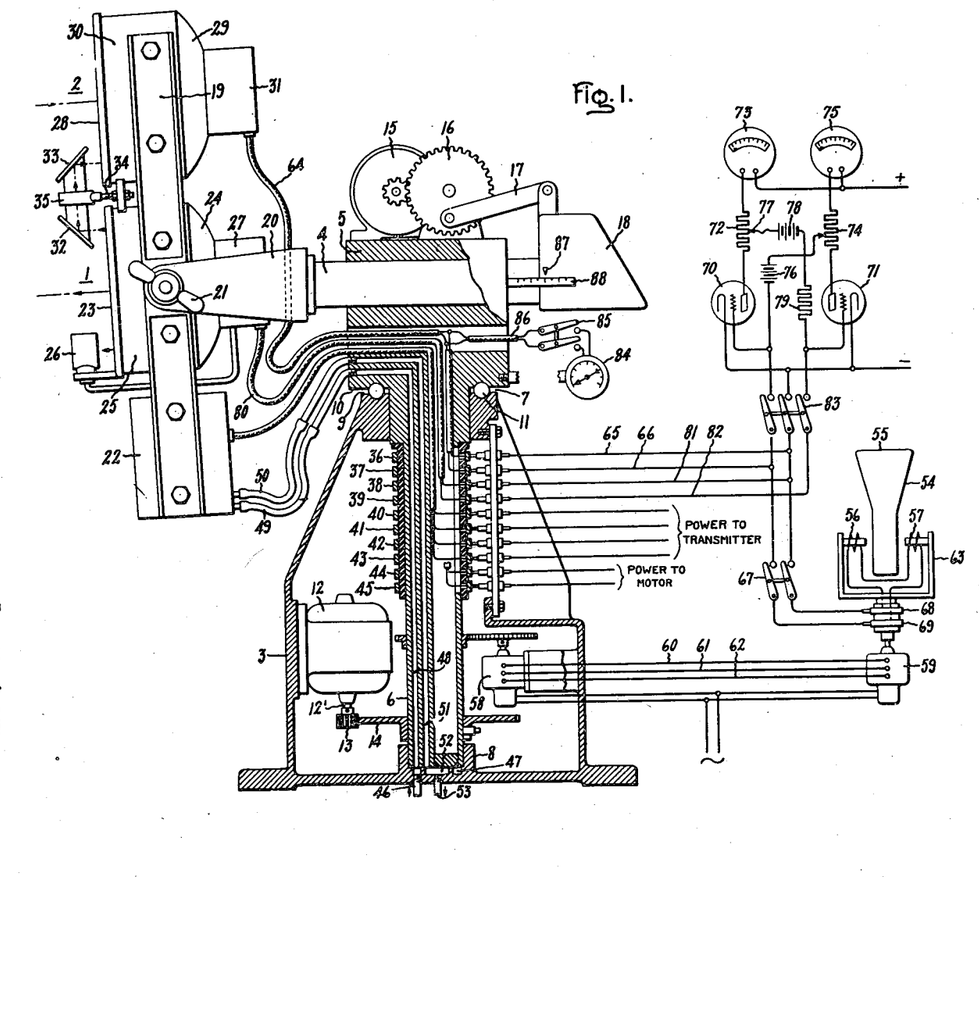
Fig. 1 illustrates apparatus embodying my invention.

Referring to Fig. 1 of the drawings, I have shown therein a radio echo apparatus which comprises a high frequency transmitter 1 of the type which is adapted to transmit a beam of extremely short radio waves in the direction indicated by the arrow, and a receiver 2 which is adapted to receive such waves after they have been scattered or reflected from a distant object. The transmitter and receiver are mounted upon a base 3 and arranged for rotation around this base. In consequence thereof, a beam of short waves or short wave impulses may be transmitted in any direction from the equipment and received from that direction after being scattered by a distant object. Transmitter 1 and receiver 2 are supported upon a shaft 4 which is arranged for motion longitudinally of itself through a bearing member 5 whereby the equipment may be oscillated in the direction in which waves are propagated and received, for a purpose which will presently be described.

A vertical shaft 6, upon which is mounted the bearing member 5, is rotatably mounted on base 3 through a ball thrust and guide bearing 7 at the top and by a guide bearing 8 at the bottom. Ball thrust and guide bearing 7 comprises a bearing plate 9 which forms the top of base 3, a shoulder 10 which constitutes the under surface of bearing block 5 and a plurality of ball bearings 11 placed therebetween.

Some suitable means for obtaining rotary motion of the radio apparatus about the base is provided such as an electric motor 12 mounted on the inner wall of base 3. As illustrated, the drive mechanism therefor comprises a small pinion gear 13 mounted on drive shaft 12' of motor 12 which meshes with a gear 14 mounted on shaft 6. The electric supply and control circuit of motor 12 is omitted from the drawing for the purpose of simplicity but it will be understood that shaft 6 may be continuously rotated or it may be moved from one angular position to another at the will of the operator.

Oscillatory motion of the radio echo apparatus in the direction of propagation of waves on which it operates is provided by mounting a motor 15 on top of bearing member 5. Motor 15 drives a crank gear 16 which oscillates shaft 4 by means of connecting rod 17. For purposes of simplicity the electric supply and control circuit of motor 15 is not illustrated but it will be understood that motor 15 may run at the will of the operator.

A counterweight 18 is secured to one end of shaft 4 to counterbalance the weight of transmitter 1 and receiver 2 across the bearing 5.

Transmitter 1 and receiver 2 are mounted in a frame 19 which is pivotally supported in a yoke 20 carried by shaft 4. Clamp 21 maintains the apparatus at the desired angle with respect to the vertical. By loosening clamp 21 and rotating frame 19 about its axis the direction in which radio waves are transmitted and received may be varied in a vertical plane.

Transmitter 1 may be of any suitable design which is capable of propagating a highly directional high frequency beam of radio waves and preferably a beam of radio waves having a wave length of only a few centimeters. One form of transmitting apparatus which has been found to give highly satisfactory results is described in my copending application, Serial No. 61,377, filed January 29, 1936, and assigned to the same assignee as the present application. For purposes of simplicity the detailed construction of the transmitting apparatus is not illustrated but it will be understood that the high frequency generating apparatus is housed in compartment 22 which is supported on frame 19 below the radio beacon 23. Radio beacon 23 comprises a parabolic metal reflector 24 and a cylindrical metal sleeve 25. The radiating member of transmitter 1 (not shown in Fig. 1) is located at the focus of parabolic reflector 24 to give the apparatus the desired directive properties.

A small monitor receiver 26, whose function will hereinafter be described, is mounted in front of beacon 23. The control apparatus for monitor receiver 26 is housed in compartment 27 located at the rear of beacon 23.

Receiver 2 of the radio echo apparatus may be of any suitable design which is capable of receiving a high frequency radio wave from a single direction. One form of receiver which has been found to give highly satisfactory results is described in my copending application, Serial No. 61,378, filed January 29, 1936, and assigned to the same assignee as the present application. For purposes of simplicity the structural details of receiver 2 are not illustrated but it will be understood that the required high frequency apparatus is located within radio beacon 28. Beacon 28 comprises a parabolic metal reflector 29 and a cylindrical metal sleeve 30. The antenna member of the receiving apparatus (not shown in Fig. 1) is located at the focus of parabolic reflector 29 in order to give the apparatus the desired directive properties. The control apparatus of receiver 2 is housed within compartment 31 located at the rear of beacon 28.

A pair of small metal reflectors 32 and 33 are mounted in front of transmitter 1 and receiver 2 on an adjustable rod 34. Reflectors 32 and 33 are disposed at a 45° angle with respect to the direction of propagation and reception whereby a small portion of the propagated wave is directly passed to receiver 2 from transmitter 1. The phase, of course, of this transferred portion of the propagated wave depends upon the length of path traveled. Hence, the phase of this portion may be regulated by adjusting rod 34. In order that intensity may also be controlled some suitable intensity control means, such as a metal iris diaphragm 35 is disposed in the path of the directly reflected wave between reflector 32 and reflector 33.

Since the radio echo apparatus is designed to be rotated about the vertical axis of shaft 6, the various power supply circuits for transmitter 1 and receiver 2 and the output circuits of receiver 2 and monitor receiver 26 are brought out through a plurality of slip rings 36, 37, 38, 39, 40, 41, 42, 43, 44 and 45.

When water cooling is necessary for the high frequency generating apparatus housed in compartment 22, it may be supplied from a supply pipe 46 to a channel ring 47 in the base of the apparatus and thence through a passage 48 in shaft 6 and finally through a flexible conduit 49 to the high frequency generating apparatus. The cooling water is conveyed away from the generating apparatus through a flexible conduit 50, a passage 51 in shaft 6, a collecting basin 52 in base 3 and out through conduit 53.

The bearing or angular position of any object detected by the radio echo apparatus is obtained by providing an instantaneous indication of the direction of propagation and reception of the apparatus, whenever scattered radiation is detected by receiver 2. Any suitable indicating means may be used, such for example, as a cathode ray tube 54 of the type which normally provides a continuous circular trace on its fluorescent for phosphorescent screen 55. A pair of coils 56 and 57 are mounted for rotation about the elongated portion of cathode ray tube 54 and are adapted to superimpose a magnetic deflecting force upon the stream of electrons as the electrons pass through the length of the tube. Coils 56 and 57 are caused to rotate around cathode ray tube 54 synchronously with the rotational motion of receiver 2 around base 3. The desired synchronization of motion of coils 56 and 57 with receiver 2 may be effected by any suitable system capable of transmitting angular movements such as by a transmitting device 58 and a reproducing device 59 which are similar in construction and are each provided with a polycircuit armature winding and a single circuit field winding. When the polycircuit armature winding of each device is physically similar to a three-phase Y or Δ connected armature winding, transmitting device 58 and reproducing device 59 are connected together by three conductors 60, 61 and 62 to like points on their respective armature windings. The field windings are connected to a suitable source of alternating current supply. The field windings induce alternating electromotive forces in their respective armature windings the relative value of these electromotive forces depending upon the angular relation between the field and armature windings. When the rotors of the transmitting device and the reproducing device are in angular agreement, the electrotive forces induced in the two armature windings are nearly opposite and hence no current is produced in the armature circuit. However, when the transmitting device is turned and held in a new position, this voltage balance no longer exists so that currents are caused to flow in the armature circuit and a torque is thereby exerted upon the rotor of the reproducing device, which torque turns it to a position in which the voltages are again balanced when the rotors are again in angular agreement.

Deflecting coils 56 and 57 are mounted upon a yoke 63 which is disposed about cathode ray tube 54 and is carried by the rotor of reproducing device 59.

Coils 56 and 57 are electrically connected to the apparatus associated with receiver 2 which is housed in compartment 31 through cable 64, slip rings 36 and 37, conductors 65 and 66, switch 67, and slip rings 68 and 69. As will presently be explained, the apparatus in compartment 31 amplifies the detected radio wave a sufficient amount to cause coils 56 and 57 to affect the desired change in the electron path in cathode ray tube 54.

After an object has been detected and its bearing determined by the radio echo apparatus, it is often desirable to determine accurately its range. One method of determining the range of an object is to transmit a sharp high frequency radio impulse and measure the time it takes the impulse to travel to the object and return.

One form of timing circuit for effecting this measurement is indicated in the drawings and comprises two electron discharge devices 70 and 71. The anode of discharge device 70 is connected through a potentiometer 72, and a current indicating device 73 to a suitable source of positive potential. The anode of discharge device 71 is similarly connected through a resistor 74 and a current indicating device 75 to the same source of positive potential. The cathodes of discharge devices 70 and 71 are connected together and to the negative side of the above potential source. The grid of discharge device 70 is connected through battery 76 to the plate of discharge device 71. The grid of discharge device 71 is connected to the plate of discharge device 70, through potentiometer 72, movable contact 77 of potentiometer 72, battery 78 and resistor 79. The grids and cathodes of discharge devices 70 and 71 are connected to the apparatus associated with receiver 2 and transmitter 1, respectively.

If a negative impulse be impressed on the grid of discharge device 71 each time a sharp high frequency impulse is propagated from transmitter 1 and if a negative impulse be impressed on the grid of discharge device 70 each time the reflected impulse is detected by receiver 2, the average plate current flowing through either discharge device will be a function of the range of the object which causes scattering or reflection of the transmitted impulse. The negative impulse derived from the propagated high frequency wave is obtained from a small monitor receiver 26 and its associated apparatus housed in compartment 27 through cable 80, slip rings 38 and 39, conductors 81 and 82 and switch 83 as will hereinafter be more fully described in connection with Fig. 2. The negative impulse derived from the received reflected impulse is similarly obtained from the apparatus housed in compartment 31 through cable 64, slip rings 36 and 37, conductors 65 and 66, and switch 83.

In my copending application, Serial No. 73,512, filed April 9, 1936, and assigned to the same assignee as the present application, a method is described and claimed for determining the relative velocities of two bodies. In that application a highly directional high frequency continuous radio wave is propagated from one body toward the other and the difference in frequency between the transmitted wave and received wave which comes back to the first body after being scattered by the second body is determined. The fact that there is a difference in frequency between the outgoing and returning wave is due to the relative motion between the two bodies. According to Doppler's principle the difference in frequency between the transmitted and received wave is a function of the relative velocity of the two bodies. The method of determining the difference in frequency between the transmitted and received wave as described in the above referred to copending application comprises beating the received wave with a portion of the transmitted wave.

In Fig. 1 of the drawings I have indicated at 84 a beat frequency responsive device, mounted on bearing member 5. This device is connected to the receiver 2 through a switch 85, cable 86, and cable 64.

A portion of the high frequency wave propagated from transmitter 1 and reflected into receiver 2 by reflectors 32 and 33 is caused to beat with the detected scattered radiation. It will be understood that beat frequency responsive device 84 may be calibrated directly in miles per hour.

Although the velocity of a moving object along the line of sight from the object to the receiving equipment may be determined from the beat frequency responsive device 84, it is impossible by this method alone to determine whether the object is moving away from the observer or coming towards him. By providing a pointer 87 on the portion of the apparatus which is adapted to be oscillated by motor 15 and by securing a scale 88 on bearing member 5, a means for determining the direction of motion along the line of sight is provided.

Figure 2:
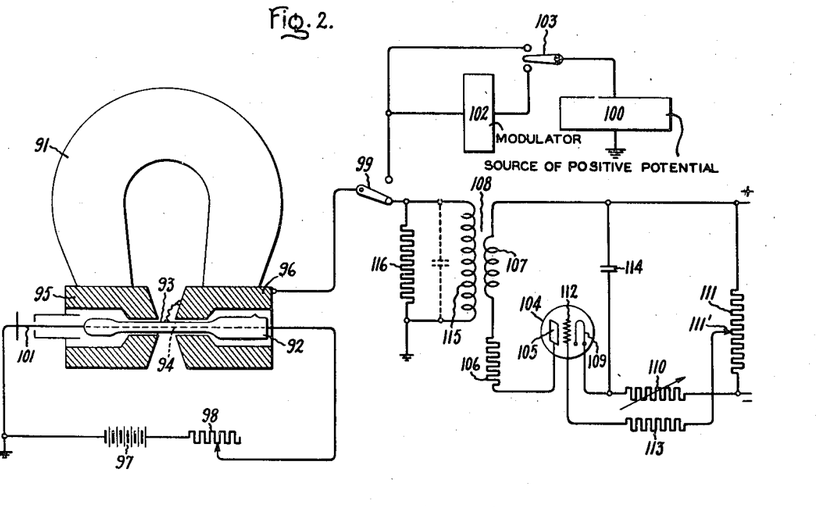
Figs. 2 and 3 show diagrammatically electrical circuits which may be employed with the apparatus of Fig. 1.

In Fig. 2 of the drawings, I have illustrated diagrammatically the electrical circuits associated with transmitter 1. The oscillation generator shown therein is described in detail and claimed in my copending application, Serial No. 61,377, filed January 29, 1936, and assigned to the same assignee as the present application and includes a permanent magnet 91 and an electron discharge device 92 comprising a long cylindrical metal anode 93 and a relatively short axial filament 94. Discharge device 92 is housed almost entirely within axial apertures of two truncated conical pole pieces 95 and 96 which are secured to the ends of permanent magnet 91, thereby causing an intense axial magnetic field to be produced about the discharge device.

Filament 94 is maintained at the desired temperature for electron emission by a source of potential 97 and a variable resistor 98.

Anode 93 is maintained at ground potential for high frequency oscillations and is energized with positive operating potential through a switch 99 from a suitable source 100. Filament 94 in consequence thereof oscillates at an extremely high frequency and the oscillations produced thereon are supplied to a suitable radiating member 101. Means for modulating the high frequency oscillations is indicated conventionally by rectangle 102, and is adapted to be placed in operation by connecting it in the high potential supply line by moving switch 103 to its lower position. For reasons of simplicity the details of my oscillation generator are not shown in the drawings.

When the oscillation generator is being used as part of a radio echo apparatus for the accurate determination of the range of a distant object, the oscillation generator must be arranged to generate periodic high frequency impulses having a duration preferably of the order of one micro second. Any suitable means for obtaining impulses from the oscillation generator of Fig. 2 may be used.

By way of example, I have illustrated a relaxation oscillator, which periodically supplies a sharp high potential impulse to anode 93 of the oscillation generator. The oscillating circuit includes an electron discharge device 104 of the type which has an ionizable medium therein. The anode 105 of discharge device 104 is connected to the positive side of a suitable high potential direct current source through a resistor 106 and the primary winding 107 of the load transformer 108. Cathode 109 of discharge device 104 is connected to the negative side of the potential source through a variable charging resistor 110. A potentiometer 111 is connected across the potential source and the movable contact 111' of potentiometer 111 is connected to grid 112 of discharge device 104 through a resistor 113. The energy storing condenser 114 of the impulse generator is connected between the positive side of the potential source and cathode 109.

The upper side of secondary winding 115 is connected to anode 93 of the oscillation generating while the lower side of winding 115 is grounded. A damping resistor 116 is connected in shunt across secondary winding 115. The inductance value of winding 115 is so chosen that the inherent capacity of the magnetron (as indicated by the dotted lines) together with winding 115 have a period substantially the same as the period of the primary circuit.

Since the value of the average plate current which flows in the direct current back-coupled circuit shown in Fig. 1 varies inversely as the time between impulses, it is desirable to have the period of the relaxation oscillator (i. e., the time between impulses) as low as possible. This period, of course, varies as a function of the value of resistance in resistor 110 and the capacitance of condenser 114. The lower limit is governed largely by the deionization time of electron discharge device 104. The time between impulses is generally 4 or 5 times this deionization time.

Since it is also desirable to render the impulse propagated from transmitter 1 as short as possible (preferably of the order of 1 micro second), the discharge of condenser 114 should have a steep wave front and be highly damped. With this type of discharge only the first wave is of sufficient intensity to raise anode 93 of the magnetron to its operating potential.

Figure 3:
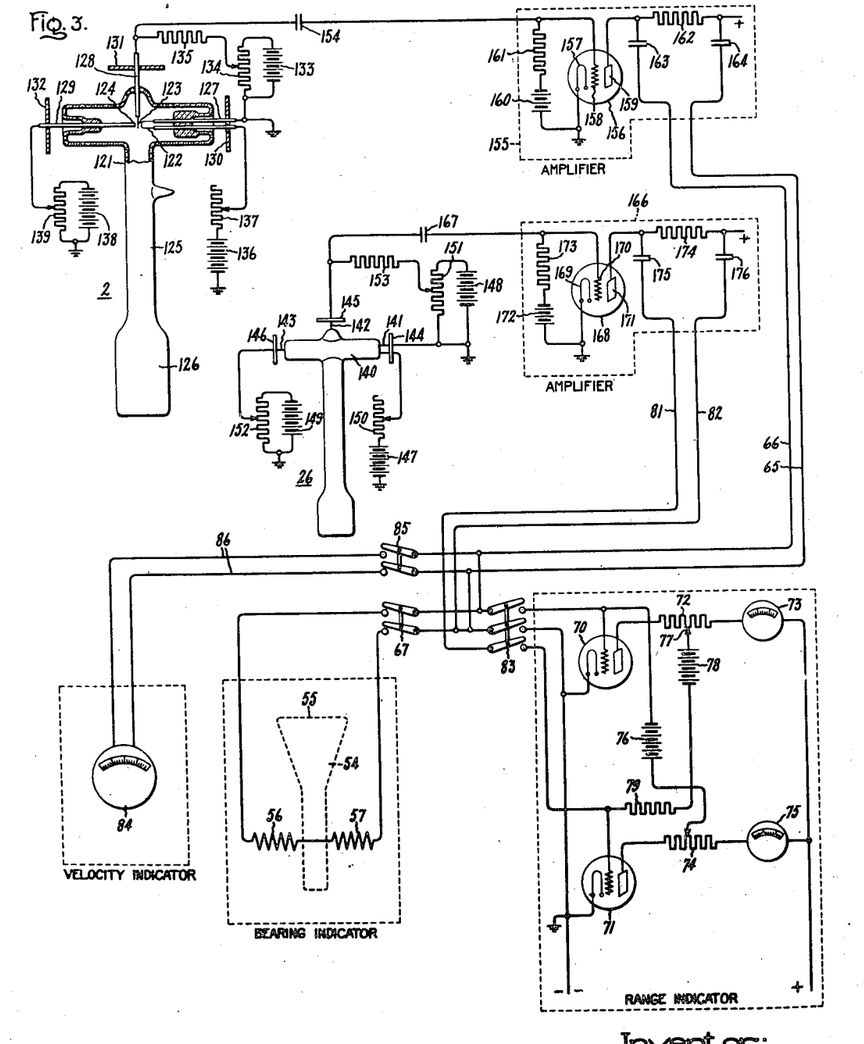

In Fig. 3 of the drawings, I have illustrated diagrammatically the electrical circuits associated with receiver 2 and monitor receiver 26. The receivers illustrated therein are of the type described and claimed in my copending application, Serial No. 61,378, filed January 29, 1936, and assigned to the same assignee as the present application. Receiver 2 as shown comprises an electron discharge device 121 having a U-shaped filament 122, a linear grid electrode 123 and a plate electrode 124. A long side tube 125 with a getter bulb 126 at the bottom is provided to take care of the occluded gases of the device in the conventional manner. The filament, grid, and plate leads 127, 128, and 129 are each provided with an electrical tuning means such as metal disks 130, 131 and 132, respectively. Grid electrode 123 is given a positive bias with respect to filament 122 by a suitable source of potential 133 through potentiometer 134 and resistor 135. A second source of potential 136 supplies the filament current necessary to heat filament 122 to its desired electron emission point through variable resistor 137. Plate electrode 124 may either be maintained at filament potential or given a negative bias by battery 138 through potentiometer 139.

Receiver 26 is similar to receiver 2 and includes an electron discharge device 140 whose filament, grid, and plate leads 141, 142, and 143 and are provided with suitable electrical tuning means 144, 145, and 146 respectively. Suitable potential sources 147, 148, and 149 are provided for the filament grid and plate electrodes (not shown) of discharge device 140. A variable resistor 150 connected in the filament supply circuit controls the flow of filament current while potentiometers 151 and 152 regulate the potential bias on the grid and plate electrodes respectively. A resistor 153 is also connected in the grid circuit.

Receiver 2 is resistance coupled by resistor 135 and capacitor 154 to an amplifier 155 which includes one or more stages. For purposes of simplicity, only one stage of amplification is illustrated and it includes an electron discharge device 156 having a cathode 157, a grid 158, and an anode 159. Grid 158 is given a negative bias with respect to cathode 157 through battery 160 and resistor 161. Anode 159 is connected to a suitable source of high potential through a resistor 162. The output of the amplifier 155 is taken from across resistor 162 through blocking condensers 163 and 164. Since the polarity of the output depends upon whether there is an odd or even number of stages of amplification, the proper number is selected to obtain a negative impulse when receiver 2 is connected to the timing circuit of the range indicator.

Receiver 26 is similarly coupled to an amplifier 166 by resistor 153 and capacitor 167. Amplifier 166 may contain any number of stages for purposes of simplicity, only one stage is shown which includes an electron discharge device 168 having a cathode 169, a grid 170 and an anode 171. Grid 170 is given a negative bias with respect to cathode 169 through battery 172 and resistor 173. Anode 171 is connected to a suitable source of potential through resistor 174. The output of amplifier 166 is taken from across resistor 174 through blocking condensers 175 and 176. The number of stages of amplification is chosen such that a negative impulse derived in the output circuit of the amplifier for the timing circuit of the range indicator.

The lower portion of Fig. 3 shows the timing circuit for the range indicator, the deflecting coils 56 and 57 of the bearing indicator, and the beat frequency responsive device 84 of the velocity indicator. This portion of the circuit of Fig. 3 has already been described in connection with Fig. 1.

Figures 4, 5, 6, 7, 8, 9, 10:
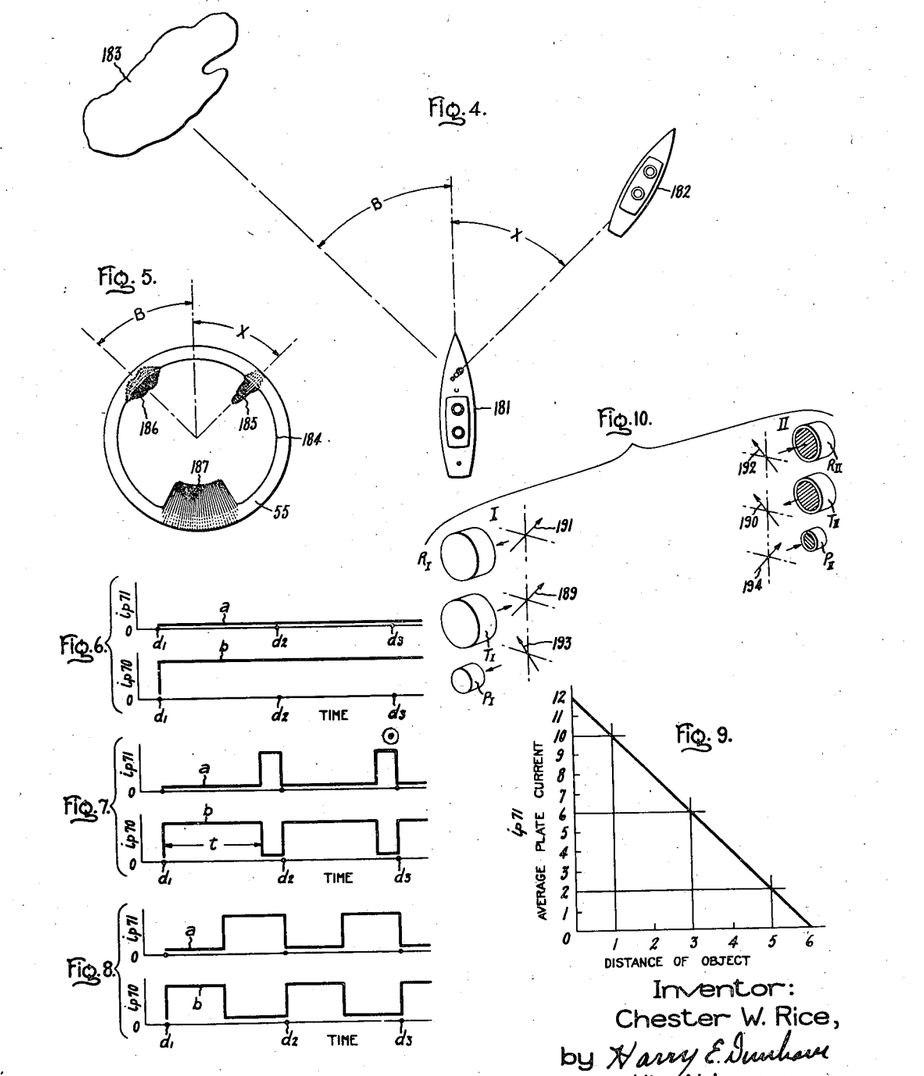
Fig. 4 shows diagrammatically the apparatus mounted on a ship for the purpose of determining the bearing of objects in the vicinity and Fig. 5 shows the bearing indicator screen.
Figs. 6, 7, 8 and 9 are diagrams illustrating the operating characteristics of the timing apparatus illustrated in Fig. 1.
Fig. 10 diagrammatically illustrates apparatus mounted on two vessels and arranged so that each apparatus may distinguish between direct and scattered radiation.

The effect of the above described apparatus when being used as a means for determining the bearing of an object with respect to an observation point is emphasized in Figs. 4 and 5 of the drawings. Fig. 4 illustrates a ship 181 upon which the apparatus has been mounted. Two objects 182 and 183 are shown as being within the horizon and hence cause scattered radiation when the radio beam from transmitter 1 impinges on them. Object 182 is illustrated as another ship while object 183 is illustrated as an island.

Fig. 5 is a plan view of the screen 55 of cathode ray tube 54. The circle 184 normally traced on screen 55 by the electron beam within the tube is bent in at 185 due to the presence of ship 182. The bearing of ship 182 indicated by the angle $\chi$ is clearly indicated on screen 55 by the depression 185. The normal circle 184 is also bent in at 186 as a result of the scattered radiation caused by island 183 and its bearing is indicated by angle B. Since the structure of ship 181 to the rear of its own radio echo apparatus also causes scattered radiation, circle 184 is bent at a bearing corresponding to the position of the structure as at 187. It should be noted that the farther away objects of a given size are from the observation point, the narrower will be the marking trace on screen 55.

The operation of my echo apparatus when used for the purpose of obtaining useful information as to the position and motion of an object from a single observation point will now be described. Let us assume that the apparatus is mounted on board ship 181. Switch 99 (Fig. 2) is thrown to its upper position thus connecting the high voltage source 100 to anode 93 of electron discharge device 92 and switch 103 is closed in its lower position, thereby connecting modulating means 102 to the high voltage supply source 100. As a result, a high frequency modulated radio beam is propagated from transmitter 1. Cathode ray tube 54 and its associated apparatus is connected to receiver 2 upon closure of switch 67 (Fig. 3). Motor 12 is energized and as a result transmitter 1 and receiver 2 are rotated in a horizontal plane, thereby causing the echo apparatus to scan the horizon for the presence of objects.

If, for example, a ship 182 and an island 183 be within the operating range of the echo apparatus, scattered radiation occurs each time the high frequency radio beam impinges on the ship and on the island. A portion of the scattered radiation is detected by receiver 2 and the demodulated wave, amplified by amplifier 155, energizes deflecting coils 56 and 57, thereby causing depressions 185 and 186 in the normally circular trace made on screen 55 of cathode ray tube 54.

It will of course be understood that if there is no detector action in the last stage of amplifier 155, the deflections will extend in both directions from the normal trace (as is indicated by the dotted lines in Fig. 5) since the polarity of coils 56 and 57 would then be reversing at modulating frequency. Since deflecting coils 56 and 57 follow the angular motion of transmitter 1 and receiver 2 due to the angle transmitting devices 58 and 59, the bearing of ship 182 and the bearing of island 183 are given by the angular position at which the deflections 185 and 186 respectively occur on screen 55. Since the intensity of scattered radiation as detected by receiver 2 is roughly proportional to the distance at which the object is from the observation point, the approximate range of ship 182 and island 183 may be obtained by noting the amplitude of the respective deflections on screen 55.

If the distant object is in motion, the bearing indicator may also be operated by placing switch 103 in its upper position so that an unmodulated continuous wave is transmitted from transmitter 1 and by adjusting diaphragm 35 (Fig. 1) so that a portion of the transmitted wave beats with the received wave. The resulting beat frequency is then used in the same manner as the demodulated wave previously described to energize the deflecting coils 56 and 57.

Let us now assume that it is desired to determine accurately the range of ship 182. Motor 12 is deenergized and the echo apparatus is directed toward ship 182. Switch 67 is opened and switch 83 is closed, thereby connecting the timing circuit to receiver 2 and monitor receiver 26. Switch 99 is thrown to its lower position thereby connecting the relaxation oscillator to anode 93 of electron discharge device 92.

The operation of the relaxation oscillator or impulse generator will be described first. Let us assume that the oscillator has just been connected to its source of potential. The cathode 109 of discharge device 104 is practically at the potential of anode 105 since the charge of condenser 114 is zero and grid 112 is negative by the amount of drop between the positive side of potentiometer 111 and movable contact 111'. Therefore, discharge device 104 remains non-conducting while condenser 114 charges up through resistance 110 until the cathode potential of the discharge device has fallen to such a value that the grid to cathode potential is equal to the critical grid voltage of the discharge device. At this moment, the gas within the discharge device becomes ionized and the condenser discharges through primary winding 107, resistor 106 and discharge device 104. The discharge current which passes through discharge device 104 does not cease at the instant when the condenser 114 becomes discharged due to the inductance of primary winding 107 which causes the condenser to be charged with the opposite polarity. A certain amount of energy is stored up in winding 107 and as the current diminishes the collapsing flux induces an electromotive force which causes the current to charge the lower plate of condenser 114 to a potential greater than that of the line. In other words the polarity of the condenser is reversed from its original state. If there were no damping in the circuit, the potential on the lower plate of the condenser would approach twice the line voltage minus the drop across the discharge device when the current finally falls to zero. In consequence thereof, at the moment when the current ceases to flow, cathode 109 is more positive than anode 105 (i. e., the anode is negative with respect to the cathode). Since current cannot pass from the cathode to the anode of the discharge device due to its rectifying property, this condition exists until the condenser 114 is recharged in its original direction through resistance 110.

It should be noted that in this type of impulse generator which uses a potentiometer across the high potential source in order to supply the desired grid bias that fluctuations of the potential source cause very little error in the impulsing time of the generator.

The sharp impulses generated by the relaxation oscillator are supplied through secondary winding 115 of the load transformer 108 to anode 93 of the oscillation generator of transmitter 1. In consequence thereof, a series of high frequency sharp impulses are propagated from transmitter 1.

At the instant when a high frequency impulse is sent out from transmitter 1 electron discharge device 71 is biased substantially to cut-off and electron discharge device 70 is biased to pass its maximum value of plate current. During the time the impulse is traveling to the object and returning, discharge devices 70 and 71 remain in this condition. The instant scattered radiation is detected by receiver 2, the bias on discharge device 70 is changed due to the negative impulse impressed on the grid of that device from receiver 2. As a result, the current flow in the plate circuit of discharge device 70 drops substantially to zero. At the same instant the bias on discharge device 71 is changed through its grid coupling circuit due to the fact that there is no longer a potential drop across resistor 72. Hence, the maximum current now flows in the plate circuit of this device.

The operation of the timing circuit will be more readily understood by referring to Figs. 6, 7, and 8 of the drawings. Curve $a$ of the figure indicates the flow of plate current in discharge device 71 and curve $b$ the plate current in discharge device 70 when no echo is being picked up by the apparatus. The dots $d_1$, $d_2$, $d_3$ indicate a succession of impulses sent out from transmitter 1 at intervals determined by the constants of the relaxation oscillator circuit.

Let us now assume that an object intercepts the high frequency impulses being propagated from transmitter 1 at a distance which causes the returning scattered radiation to reach receiver 2 at a time $t$ after each impulse is sent out. Such a condition is shown in Fig. 7 of the drawings. $t$ seconds after impulse $d_1$ is sent out, the returning detected wave triggers the two discharge devices, causing device 71 to draw its maximum current and causing device 70 to draw its minimum current. This is shown by curves $a$ and $b$ respectively in Fig. 7.

Discharge device 71 continues to pass current until a succeeding high frequency impulse is sent out from transmitter 1. As the succeeding impulse is transmitted, monitor receiver 26 detects a portion of the outgoing wave and impresses a negative impulse on the grid of discharge device 71. The negative impulse thus impressed on the grid of discharge device 71 changes the bias to cut-off and current ceases to flow in the plate circuit thereof. As discharge device 71 stops conducting the grid of discharge device 70 is again given a sufficiently positive bias to cause current to flow again in the plate circuit of this device. This condition is clearly illustrated by the curves in Fig. 7. As previously explained, the average plate current flowing through either discharge device 71 and discharge device 70 may be used to determine the elapsed time of the impulse and hence the distance of the object. Assuming that indicating device 75 has been calibrated to read directly in units of distance the range of ship 182 will be indicated thereon.

If it should happen that two echoes are sent back from a single outgoing impulse, an inspection of Fig. 8 will show that only the arrival of the first echo, if sufficiently intense to carry the grid of discharge device 70 negative, is effective. The arrival of the second negative impulse from the more distant echo merely impresses a second negative impulse on the grid of discharge device 70 which is already negative. Since discharge device 71 is already drawing maximum plate current and since discharge device 70 is already drawing minimum plate current, the arrival of the second echo has no effect on the timing circuit.

Fig. 9 is a chart which illustrates the relation of average plate current in discharge device 71 with respect to the distance of the object.

The range and bearing of ship 182 having been determined, the relative velocity of the ship along the line of sight may next be determined. By opening switch 83 and closing switch 85 in the receiver circuit and by moving switch 99 to its upper position and moving switch 103 to its upper position in the transmitter circuit, a high frequency continuous wave is propagated from transmitter 1 and a portion of the scattered radiation caused by the impingement of the high frequency wave on ship 182 will be detected by receiver 2. A small portion of the propagated wave is passed directly from transmitter 1 to receiver 2 by reflectors 32 and 33. Iris diaphragm 35 is opened a sufficient amount to pass a wave of the desired intensity. This portion of the transmitted wave is caused to beat with the received detected scattered radiation in discharge device 121. The resulting beat oscillation is amplified by amplifier 155 and is then passed to frequency responsive device 84. The difference in frequency between the outgoing and the received wave depends upon the relative velocity of ship 182 along the line of sight and hence the velocity may be read directly by properly calibrating beat frequency responsive device 84. Of course, if the object be standing still no beat frequency is detected.

The direction of motion of ship 182 along the line of sight is next determined by energizing motor 15. The oscillatory motion of transmitter 1 and receiver 2 along the line of sight causes an oscillation of the pointer on beat frequency responsive device 84 due to the fact that the point with reference to which the velocity of the distant object is to be determined is no longer stationary. If the object, whose direction of motion is to be determined, be moving away from the apparatus a minimum of frequency occurs during the forward motion of the apparatus. If the object be moving toward the observer, a maximum of frequency occurs during the forward motion of the apparatus. If the object be standing still the frequency is the same during each direction of motion of the apparatus. The presence of the beat note, in any case, of course, indicates the presence of the object in the path of the radiated waves. Thus, by watching pointer 87 which indicates the oscillatory motion of transmitter 1 and receiver 2 and by watching the pointer on beat frequency responsive device 84 the direction of motion of ship 182 along the line of sight is determined.

It will be understood that once the line of sight velocity, the direction of motion along the line of sight, and the range has been determined, it is a simple matter to determine the actual velocity and true direction of motion by computing the component of motion perpendicular to the line of sight from the angular speed of the apparatus which is needed to maintain an echo. Knowing the line of sight velocity of the object and the velocity normal to the line of sight, it is a simple matter to compute the true velocity and direction of the distant object. If the observation point is also in motion it is necessary to take into account the velocity and direction of motion of the observation point.

When high frequency echo apparatus is mounted on a number of vessels navigating in the same vicinity and are operating on the same wave length, it is desirable that apparatus mounted on one vessel be able to distinguish between scattered radiation resulting from its own propagated wave and the direct radiation coming from apparatus mounted on another vessel but pointed toward the first. It has been found that such a result may be obtained if each apparatus propagates a wave polarized at some predetermined angle from the vertical. The nearer this angle is to 45° the greater will be the discriminating properties of the apparatus, as will presently be explained.

In Fig. 10, I have illustrated diagrammatically two radio echo equipments I and II, which are mounted, for example, on two ships facing each other and have indicated by suitable vectors their respective planes of polarization. For reasons of simplicity, only the transmitter and receiver of each equipment together with an auxiliary receiver whose function will presently be explained, are shown in this figure. Transmitters $T_I$ and $T_{II}$ are each adapted to propagate a high frequency radio beam whose plane of polarization is at 45° to the right of the vertical in the direction of propagation. This may be done, for example, by arranging the radiating member of the transmitter so that it lies in the plane of the desired polarization. The plane of polarization of transmitter $T_I$ (i. e., the electric field of the radiated wave) is indicated by vector 189 and that of $T_{II}$ by vector 190. Receiver $R_I$ of apparatus I is polarized by suitably positioning the antenna member or members in the same plane as its associated transmitter, as is indicated by vector 191. Receiver $R_{II}$ is similarly polarized as is indicated by vector 192. Let us now assume that a high frequency radio beam is being propagated from each transmitter. The wave propagated from transmitter $T_I$ is scattered by the vessel on which apparatus II is mounted and a portion of the scattered radiation will be detected by receiver $R_I$. Since very short waves are used, the plane of polarization is not changed by the scattering and hence, the detected scattered radiation will have the same plane of polarization as that of the transmitted wave. Furthermore, since receiver $R_I$ is a polarized receiver it will not be able to detect direct radiation from transmitter $T_{II}$ since this radiation is polarized at 90° from the plane of polarization of receiver $R_I$ due to the fact that transmitter II and receiver I face each other. It will be observed that when transmitter $T_{II}$ and receiver $R_I$ are both pointing in the same direction their respective planes of polarization coincide. Similarly, receiver $R_{II}$ will be able to detect scattered radiation resulting from the impingement of the wave propagated from transmitter T$_{II}$ which is scattered from the vessel on which apparatus I is mounted but it will not be able to detect direct radiation from transmitter T$_I$. If the planes of polarization of the apparatus are so chosen that they are, for example, at 30° from the vertical, direct radiation from one transmitter appears only 60° out of coincidence with the plane of polarization of the other receivers. It is thus apparent that by simply polarizing the apparatus on all vessels at some predetermined angle from the vertical, (preferably 45° since this angle is obviously the only angle which will give complete discrimination), each apparatus will be able to distinguish between scattered radiation resulting from its own propogated wave and direct radiation resulting from the propagated wave of a second apparatus which is facing the first.

It is sometimes desirable to provide an additional receiver with each apparatus which is polarized at the angle with respect to the vertical equal and opposite to the angle of the associated echo apparatus in order that direct radiation from a second apparatus which is facing the first may be detected with maximum efficienecy. I have indicated such a receiver with apparatus I as P$_I$ and such a receiver with apparatus II as P$_{II}$. Their planes of polarization are indicated by vectors 193 and 194 respectively.

While I have described a preferred embodiment of my invention many modifications will, of course, suggest themselves to those skilled in the art. For example, when the echo apparatus is being used to determine the presence of a distant object, or the direction of motion of an object along the line of sight, a reflector (not shown) mounted at an angle in front of transmitter 1 and receiver 2 may be oscillated or vibrated in order to provide the desired rate of change of path length of the high frequency wave rather than oscillating transmitter 1 and receiver 2 themselves.

It will also occur to those skilled in the art that echo apparatus of the type described may be used for harbor protection in the place of a beam of light and a light responsive cell by simply mounting the apparatus on one shore and pointing it across the harbor. Whenever a vessel intercepts the beam of the echo apparatus, a depression of greater depth than that caused by the opposite shore appears on screen 55 of the cathode ray tube 54, or its presence and distance may be determinated by the range indicator.

Although I have described as the preferred embodiment of my invention, the use of high frequency apparatus which includes not only a highly directive transmitting unit but also a highly directive receiving unit, it will be understood that only one of the units need have highly directive properties. If a highly directive transmitter is used in conjunction with a non-directive receiver, the radiated waves impinge upon only a small area of the distant object and hence scattering and reflection occurs only from that small area, and the apparatus as a whole maintains its requisite directional properties. If a highly directive receiver be used in conjunction with a non-directional transmitter, scattering and reflection occurs over a large area of the reference body but since the receiver is only responsive to the scattering and reflection which occurs at a small spot on the surface of the reference body, the apparatus as a whole maintains its requisite directional properties.

While I have shown a particular embodiment of my invention, it will of course be understood that I do not wish to be limited thereto since many modifications may be made both in the circuit arrangement and in the instrumentalities employed, and I therefore contemplate by the appended claims to cover all such modifications as fall within the true spirit and scope of my invention.

What I claim as new and desire to secure by Letters Patent of the United States is:

1. In an apparatus for determining the direction of an object from an observation point, the combination comprising a radio echo scanning apparatus, means to rotate said apparatus thereby to scan a distant object whereby an echo is received in said apparatus when said apparatus during said rotation is directed toward said distant object, a cathode ray oscillograph of the type having a stream of electrons which normally traces a predetermined path on the oscillograph screen, and means operable synchronously with the movement of said scanning apparatus for deflecting said stream of electrons from its normal path at a point thereon corresponding to the direction in which said scanning apparatus is directed when said echo is received.

2. The combination in a radio echo scanning apparatus, of means to rotate said apparatus thereby to scan a distant surface by a beam of waves rotated about a predetermined position from which said beam is projected and to receive said waves when reflected from said distant surface, an indicating device, means responsive to said reflected waves received in said scanning apparatus to control said indicating device, and means movable synchronously with the movement of said scanning apparatus to control said last-named means in accordance with the direction in which said scanning apparatus is directed when said reflected waves are received.

3. The combination, in a radio echo apparatus, of means to radiate periodic high frequency impulses toward a distant surface and to receive said impulses after impingement on said surface, means to measure the time interval between transmission and reception of the respective impulses, said means comprising an electron discharge device, means to change the current in said discharge device from one of two predetermined values to the other when any impulse is transmitted and to return said current from said other predetermined value to said one predetermined value when the respective impulse is received, and means to measure the average value of said current, whereby the average value of said current is dependent upon the distance to said object.

4. In an apparatus for determining the distance of an object, the combination, comprising means for periodically propagating a high frequency radio impulse toward said object, means for receiving scattered radiation resulting from the impingement of said impulse on said object, means for measuring the elapsed time between transmission and reception of said impulse, said timing means including an electron discharge device normally biased substantially to cut-off, a second electron discharge device normally biased to pass current, means responsive to said received scattered radiation for rendering said first discharge device substantially non-conducting, means responsive to a transmitted impulse for changing the bias on said discharge devices to their original state, and means for indicating the average current flowing through one of said discharge devices.

5. In apparatus for determining from an observation point the direction of motion of a moving object along the line of sight, the combination of means for transmitting a high frequency wave toward said object, means for receiving said wave after impingement on said object, means for increasing and decreasing the length of path traveled by said wave, and means for indicating whether the greatest difference in frequency between the transmitted and received wave occurs on an increasing or decreasing path length.

6. In radio echo apparatus, the combination comprising means for obtaining a radio echo from a moving object, means for determining the actual velocity at a given instant of said object along the line of sight between said apparatus and said object, and means utilizing said last means for determining the direction of motion of said object along said line of sight.

7. In apparatus for ascertaining information about an object, the combination comprising means for obtaining a radio echo from said object, means responsive to said echo to indicate the direction of said object from said apparatus and its actual velocity at a given instant in said direction.

8. In radio echo apparatus, the combination of means for transmitting a high frequency wave to an object to be located, means for obtaining a radio echo of said wave from said object, means responsive to said echo for determining the angular position of said object with respect to said apparatus, and means responsive to a beat frequency of said wave and said echo for determining the direction of motion of said object along the line between said apparatus and said object.

9. In radio echo apparatus, the combination of means for obtaining a radio echo from a distant object, means responsive to said echo for indicating the angular position of said object, means responsive to said echo for determining the actual line of sight velocity at a given instant of said object, and means responsive to said echo for determining the direction of motion of said object along the line of sight.

10. The combination comprising radio echo apparatus mounted on one body, a second radio echo apparatus mounted on a second body, said apparatus being capable of orientation toward each other, said first-named apparatus being polarized at a predetermined angle from the vertical and said second-named apparatus being polarized at substantially an angle from the vertical equal and opposite to said predetermined angle when said two apparatus are oriented toward each other whereby each of said apparatus receives radiation resulting from its own propagated wave after impingement upon a distant surface and rejects direct radiation coming from the other of said apparatus, and additional means positioned near said first apparatus for detecting only said direct radiation from the transmitter of said second apparatus.

11. In combination, means to project short radio waves toward a distant moving surface, means to receive said waves after reflection thereof from said surface, and local means responsive to a beat frequency of a portion of said projected waves and said received waves to indicate the direction of motion of the distant surface.

12. In combination, means to project short radio waves toward a distant moving surface, means to receive said waves after reflection thereof from said surface, and means responsive to the frequency of the received wave to indicate the actual velocity at a given instant of the distant object.

13. In combination, means to project short radio waves toward a distant moving surface, means to receive said waves after reflection thereof from said surface, means to move at least one of said first-named and last-named means along the line of sight between the said one means and said surface, and means responsive to the frequency of the wave received by said receiving means during motion of said one means, to indicate the velocity of the distant surface.

14. In combination, a radio echo scanning apparatus, means to rotate said apparatus thereby to scan a distant area for surfaces producing echoes in said apparatus, an indicating device, means responsive to an echo received in said scanning apparatus to control said indicating device, and means operable synchronously with the movement of said scanning apparatus to control said last means thereby to vary the indication produced by said indicating device in accordance with the direction in which said scanning device is directed when said echo is received.

15. In combination, a radio echo scanning apparatus, means to rotate said apparatus thereby to scan a distant area for surfaces producing echoes in said apparatus, a cathode ray oscillograph, means responsive to an echo received in said scanning apparatus from a distant surface to influence the cathode ray of said oscillograph, and means operable synchronously with the movements of said scanning apparatus to control said last means thereby to control said oscillograph in accordance with the direction in which said scanning apparatus is directed when said echo is received.

16. The method of determining with reference to an observation point the direction and line of sight velocity of a distant surface which includes scanning said surface with an electromagnetic wave radiated from said point having dimensions such that component surfaces of said surface normal to the direction of propagation of said electromagnet waves reradiate said wave with high directivity in the direction from which they arrive at said surfaces and such that said waves are effectively scattered by other components of said surface thereby producing additional reradiation in said direction, receiving a portion of said reradiation at said point, utilizing at said point said portion to indicate directly said direction of said surface from said observation point, and beating at said point said radiated wave and said reradiation to indicate said line of sight velocity of said surface.

17. The method of determining with reference to an observation point the direction and line of sight velocity of a distant surface which includes scanning said surface with electromagnetic waves radiated from said point having dimensions such that component surfaces of said surface normal to the direction of propagation of said electromagnetic waves have effective lateral dimensions several times the wavelength of said waves and hence reradiate said waves with high directivity in the direction from which they arrive at said surface, utilizing at said point a portion of said reradiated waves to indicate directly said direction, and beating at said point a portion of said radiated waves and of said reradiated waves to indicate said line of sight velocity.

18. The method of determining with reference to an observation point the direction and line of sight velocity of a distant surface which includes scanning said surface with electromagetic waves radiated from said point having a wave length sufficiently short that any component portion disposed at right angles to the direction of impingement of said electromagnetic waves on said surface reradiates said waves by reason of its large dimensions with respect to said wavelength with a sharply directive radiation pattern, said pattern being substantially bisected by said direction, the sharpness of directivity of said pattern being dependent upon the dimensions of said component portion relative to said wavelength, utilizing at said point a portion of said reradiated waves to indicate directly said direction, and beating at said point a portion of said radiated waves and of said reradiated waves to indicate said line of sight velocity.

19. The method of determining with reference to an observation point the direction and line of sight velocity of a distant surface which includes scanning said surface with a radio wave having a wavelength of the order of five centimeters, receiving at said point a portion of said wave reflected from said surface, utilizing at said point a portion of said reflected wave to indicate directly said direction, and beating at said point a portion of said radiated wave and of said reflected wave to indicate said line of sight velocity.

20. The method of determining with reference to an observation point the direction and line of sight velocity of a distant surface which includes scanning said surface with a radio wave having a wavelength not greater than eight centimeters nor less than two centimeters, receiving at said point a portion of said wave reflected from said surface, utilizing at said point a portion of said reflected wave to indicate directly said direction, and beating at said point a portion of said radiated wave and of said reflected wave to indicate said line of sight velocity.

21. The method of reception of waves radiated by a transmitter and received by a receiver after reflection from a distant surface, which comprises producing a beat note between the radiated and received waves by locally reflecting a part of the radiated waves into the receiver and varying the length of the path traveled by said locally reflected waves to vary the frequency of such waves as received in the receiver.

22. In combination, a transmitter, a receiver, said receiver being arranged to receive waves from the transmitter after reflection from a distant surface, a reflector mounted locally with respect to said transmitter and receiver to reflect waves from the transmitter to the receiver, and means to move the reflector to vary the frequency of the reflected waves as received in the receiver.

23. In combination, a short wave radiator, a short wave interceptor, shielding means to prevent waves radiated by said radiator from being intercepted by said interceptor except when propagated over a predetermined path disposed wholly in proximity to said radiator and interceptor, and means to vary the length of said path thereby to vary the phase with which energy propagated thereover arrives at said interceptor.

24. The method of reception of waves radiated by a transmitter and received by a receiver after traversing a path to a distant reflecting surface which comprises reflecting a part of the radiated waves to the receiver through a local path of controllable length, combining waves received through said local path with waves received from the distant surface, and varying the length of one of said paths.

25. In combination, a short wave directive transmitter, a short wave directive interceptor, said transmitter and interceptor being positioned together, and oriented at a distant object so that waves radiated from the transmitter are intercepted by said interceptor after reflection from the distant object, said transmitter and interceptor being shielded from each other, reflecting means located in close proximity to said transmitter and interceptor and positioned to reflect energy radiated from the transmitter to the interceptor to combine therein with energy received from the distant object.

26. In combination, a short wave directive transmitter, a short wave directive interceptor, said transmitter and interceptor being positioned together and oriented at a distant object, so that waves radiated from the transmitter are intercepted by said interceptor after reflection from the distant object, said transmitter and interceptor being shielded from each other, reflecting means located in close proximity to said transmitter and interceptor and positioned to reflect energy radiated from the transmitter into the interceptor to combine therein with energy received from the distant object, and a shield variably positioned in the path of waves received on said interceptor through reflection from said reflector to vary the amount of said waves so received from said transmitter.

27. The method of reception of waves radiated by a transmitter and received by a receiver after traversing a path to a distant reflecting surface, which comprises transmitting a part of the radiated waves to the receiver through a local path of controllable length, combining waves received through said local path with waves received from the distant surface, and producing a beat note in said receiver between the waves received over said two paths by variation of the length of one of said paths.

28. The method of determining the relative velocity of two bodies which includes radiating high frequency electromagnetic waves from one body toward the other, receiving said waves on said one body after reflection from said other body, and determining said relative velocity from the frequency of the received waves.

29. The method of determining the relative velocity of two bodies which includes radiating high frequency electromagnetic waves of substantially constant frequency from one body toward the other, receiving said waves on said one body after reflection from said other body, causing said received waves to beat with the radiated waves to produce a beat note having a frequency dependent upon said relative velocity, and determining said relative velocity from the frequency of the beat note.

30. Apparatus for determining the relative velocity of two bodies including means mounted on one of said bodies for propagating an electromagnetic high frequency radio wave of substantially constant frequency toward the other of said bodies, and means on said first body responsive to the frequency of the scattered radiation resulting from the impingement of said wave on said second body for indicating the relative velocity of said bodies.

31. Apparatus for determining the relative velocity of two bodies comprising means mounted on one of said bodies for propagating a wave of substantially constant radio frequency toward the other of said bodies, means responsive to scattered radiation resulting from the impingement of said wave on said second body, and means for determining the difference in frequency between said transmitted wave and said received wave thereby to determine the relative velocity of said bodies.

32. The method of determining the relative velocity of two bodies which includes radiating a high frequency electromagnetic wave from one of said bodies toward the other, receiving on one of said bodies that portion of said wave which is reflected from substantially a single point on said other body and determining said relative velocity from the frequency of the received wave.

33. The combination in a system for determining the relative velocity of two bodies, of means for radiating electromagnetic oscillations of substantially constant frequency from one of said bodies toward the other and for receiving said oscillations on said one body after reflection from the other body, said means having such directive properties that only waves reflected from substantially a single point on said other body are received on said one body, and means responsive to the frequency of said received waves to operate in accordance with said relative velocity.

34. Radio apparatus comprising in combination, a pair of focussed beam antennae, means for continuously varying the orientation of the directional axes of said antennae while maintaining substantial parallelism between said axes, means for emitting ultra short wave energy from one of said antennae, a receiver connected to the other of said antennae and responsive to such of said energy as may be reflected by a distant object, means connected to said receiver for producing a graphic indication of its response to the reflected energy, and means for correlating said graphic indication with an indicated axis of reference.

35. In an apparatus for determining the direction of an object from an observation point, the combination of a radio echo scanning apparatus, means to rotate said apparatus thereby to scan a distant object whereby an echo is received in said apparatus when said apparatus during its rotation is directed toward said distant object, a cathode ray oscillograph, means to supply said received echo from said scanning apparatus to said cathode ray oscillograph to cause a deflection of the electron beam thereof, and means to control said cathode ray oscillograph in accordance with the movement of said scanning apparatus to cause said deflection to correspond with the direction from which said echo is received.

36. In an apparatus for determining the direction of an object from an observation point, the combination of a radio echo scanning apparatus, means to rotate said apparatus thereby to scan a distant object whereby an echo is received in said apparatus when said apparatus during its rotation is directed toward said distant object, a cathode ray oscillograph, means to produce an indication on said oscillograph of the direction from which said echo is received, said last means including means to control said oscillograph in accordance with the movement of said scanning apparatus, and means to control said oscillograph by the echo received in said scanning apparatus.

37. In combination, a radio echo scanning apparatus, means to rotate said apparatus thereby to scan a distant area for surfaces producing echoes in said apparatus, an indicating device, means responsive to an echo received in said scanning apparatus to control said indicating device, and means operable synchronously with the movement of said scanning apparatus to vary the indication produced by said indicating device in accordance with the direction in which said scanning device is directed when said echo is received.

38. The combination, in a radio echo scanning apparatus, of means to rotate said apparatus thereby to scan a distant area by a beam of waves rotated about a predetermined position from which said beam is projected and to receive said waves when reflected from surfaces in said area, a cathode ray device having a viewing screen, a rotatable deflection coil structure about said cathode ray device, means to rotate said rotatable deflection coil structure synchronously with said scanning apparatus thereby to rotate the ray of said device over said screen, and means responsive to waves received from distant surfaces to control said ray to produce an indication on said viewing screen at a position corresponding to the direction from which said waves are received.

CHESTER W. RICE.